(12) United States Patent
Majima et al.

(10) Patent No.: US 9,409,237 B2
(45) Date of Patent: Aug. 9, 2016

(54) FINISH DEPTH TURNING INSERT COMPRISING A CHIP CONTROL ARRANGEMENT

(71) Applicant: Iscar, Ltd., Tefen (IL)

(72) Inventors: Shinya Majima, Aichiken (JP); Daniel Hen, Nahariya (IL)

(73) Assignee: Iscar, Ltd., Tefen (IL)

( * ) Notice: Subject to any disclaimer, the term of this patent is extended or adjusted under 35 U.S.C. 154(b) by 167 days.

(21) Appl. No.: 14/028,263

(22) Filed: Sep. 16, 2013

(65) Prior Publication Data

US 2015/0078844 A1    Mar. 19, 2015

(51) Int. Cl.
*B23B 27/22* (2006.01)
*B23B 27/16* (2006.01)
*B23B 27/14* (2006.01)

(52) U.S. Cl.
CPC ........... *B23B 27/1607* (2013.01); *B23B 27/143* (2013.01); *B23B 27/22* (2013.01); *B23B 2200/081* (2013.01); *B23B 2200/321* (2013.01); *Y10T 407/235* (2015.01); *Y10T 407/24* (2015.01)

(58) Field of Classification Search
CPC  B23B 27/141; B23B 27/143; B23B 27/1607; B23B 27/1618; B23B 27/1637; B23B 27/1648; B23B 27/22; B23B 2200/32; B23B 2200/321; B23B 2200/323; Y10T 407/24; Y10T 407/245; Y10T 407/235
See application file for complete search history.

(56) References Cited

U.S. PATENT DOCUMENTS

| 4,214,845 | A | * | 7/1980 | Mori .............................. 407/114 |
| 4,629,371 | A | * | 12/1986 | Maeda et al. ................. 407/114 |
| 4,941,780 | A | * | 7/1990 | Takahashi ..................... 407/114 |
| 5,032,049 | A |   | 7/1991 | Hessman et al. |
| 5,116,167 | A | * | 5/1992 | Niebauer ....................... 407/114 |
| 5,122,017 | A |   | 6/1992 | Niebauer |
| 5,147,159 | A | * | 9/1992 | Lowe et al. ................... 407/114 |
| 5,192,171 | A |   | 3/1993 | Ther et al. |
| 5,193,947 | A |   | 3/1993 | Bernadic et al. |
| 5,222,843 | A | * | 6/1993 | Katbi et al. ................... 407/114 |
| 5,230,591 | A |   | 7/1993 | Katbi et al. |
| 5,282,703 | A |   | 2/1994 | Itaba et al. |
| 5,372,463 | A | * | 12/1994 | Takahashi et al. ............ 407/114 |
| 5,476,346 | A |   | 12/1995 | Lundström |

(Continued)

FOREIGN PATENT DOCUMENTS

| DE | 4309897 A1 * | 8/1994 | ............. B23B 27/16 |
| EP | 1852200 A2 * | 11/2007 | ............. B23B 27/14 |

(Continued)

OTHER PUBLICATIONS

International Search Report dated Oct. 21, 2014 issued in PCT counterpart application (No. PCT/IL2014/050596).

*Primary Examiner* — Sunil K Singh
*Assistant Examiner* — Donte Brown
(74) *Attorney, Agent, or Firm* — Womble Carlyle

(57) ABSTRACT

A finish depth turning insert includes a chip control arrangement. The chip control arrangement includes a medium protuberance for medium depth machining operations and a finish protuberance for finish depth machining operations. The finish protuberance is located between the medium protuberance and a corner of the insert. The finish protuberance also includes a front finish deflector surface and first and second relief surfaces extending towards the medium protuberance from the front finish deflector surface.

26 Claims, 6 Drawing Sheets

(56) References Cited

U.S. PATENT DOCUMENTS

| | | | |
|---|---|---|---|
| 5,577,867 A | 11/1996 | Paya | |
| 5,628,590 A | 5/1997 | Beeghly et al. | |
| 5,634,745 A * | 6/1997 | Wiman et al. | 407/113 |
| 5,743,681 A | 4/1998 | Wiman et al. | |
| 6,065,907 A | 5/2000 | Ghosh et al. | |
| 6,123,488 A | 9/2000 | Kasperik et al. | |
| 6,217,264 B1 | 4/2001 | Kim et al. | |
| RE37,149 E * | 5/2001 | Hartlohner et al. | D15/139 |
| 6,234,726 B1 | 5/2001 | Okada et al. | |
| 7,182,555 B2 * | 2/2007 | Kitagawa et al. | 407/113 |
| 7,909,546 B2 * | 3/2011 | Nada et al. | 407/114 |
| 8,025,465 B2 * | 9/2011 | Ishida | 407/114 |
| 8,251,618 B2 * | 8/2012 | Kobayashi | 407/115 |
| 8,262,324 B2 * | 9/2012 | Park et al. | 407/113 |
| 8,267,623 B2 * | 9/2012 | Park et al. | 407/113 |
| 8,342,779 B2 * | 1/2013 | Kobayashi | 407/113 |
| 8,491,231 B2 * | 7/2013 | Edler et al. | 407/103 |
| 8,585,330 B2 * | 11/2013 | Yamazaki et al. | 407/113 |
| 8,777,525 B2 * | 7/2014 | Lof | 407/114 |
| 2005/0019111 A1 | 1/2005 | Kitagawa et al. | |
| 2007/0160433 A1 * | 7/2007 | Lee et al. | 407/113 |
| 2007/0298230 A1 | 12/2007 | Omori et al. | |
| 2011/0033252 A1 * | 2/2011 | Nishida | 407/114 |
| 2011/0142555 A1 * | 6/2011 | Yamazaki | B23B 27/143 407/2 |
| 2012/0128438 A1 * | 5/2012 | Tanaka et al. | 407/115 |
| 2012/0177452 A1 | 7/2012 | Konta | |
| 2012/0198973 A1 * | 8/2012 | Schleinkofer et al. | 82/117 |
| 2013/0236257 A1 * | 9/2013 | Nada et al. | 407/114 |
| 2013/0236258 A1 * | 9/2013 | Nada et al. | 407/114 |
| 2014/0239051 A1 * | 8/2014 | Barry et al. | 228/121 |
| 2014/0286717 A1 * | 9/2014 | Lof et al. | 407/114 |
| 2014/0286718 A1 | 9/2014 | Scherman et al. | |
| 2015/0075338 A1 * | 3/2015 | Onodera | 82/1.11 |
| 2015/0090080 A1 * | 4/2015 | Sakai | 82/1.11 |

FOREIGN PATENT DOCUMENTS

| | | | |
|---|---|---|---|
| JP | 2004-106150 | 4/2004 | |
| WO | WO 2005118187 A1 * | 12/2005 | B23B 27/14 |
| WO | WO 2011121787 A1 * | 10/2011 | B23B 27/14 |
| WO | WO 2012067114 A1 * | 5/2012 | B23B 27/141 |
| WO | WO 2014192798 A1 * | 12/2014 | B23B 27/22 |

* cited by examiner

FINISH DEPTH TURNING INSERT COMPRISING A CHIP CONTROL ARRANGEMENT

FIELD OF THE INVENTION

The subject matter of the present application relates to an insert for machining operations, in particular a turning insert comprising a chip control arrangement for finish depth machining operations.

BACKGROUND OF THE INVENTION

Amongst the multitudinous publications relating to turning inserts and chip control arrangements thereof, U.S. Pat. No. 4,941,780 describes a number of notable chip control arrangements designed for providing an insert configured for finish, medium and roughing depth machining operations.

In the present application, finish machining operations are considered to have a depth of cut between 0.3 mm to 2.0 mm, medium machining operations having a depth greater than 2.0 mm and less than 4.0 mm, and rough machining operations having a depth greater than 4.0 mm.

Unlike the subject matter of U.S. Pat. No. 4,941,780, the subject matter of the present application is designed specifically for finish depth machining operations with additional features for incidental overlap into the adjacent medium depth range (i.e. until 3.0 mm depth).

SUMMARY OF THE INVENTION

The chip control arrangement according to the subject matter of the present application has been developed to provide relatively long tool life and good burr performance at the finish depth range and the adjacent medium depth range, for stainless steel machining in particular.

In accordance with a first aspect of the subject matter of the present application, there is provided a finish depth turning insert comprising a chip control arrangement; the chip control arrangement comprising a medium protuberance (i.e. a protuberance configured for controlling chips at medium depth machining operations) and a finish protuberance (i.e. a protuberance configured for controlling chips at finish depth machining operations) located between the medium protuberance and a corner. The finish protuberance also includes a front finish deflector surface and first and second relief surfaces extending towards the medium protuberance from the front finish deflector surface.

In accordance with another aspect of the subject matter of the present application, there is provided a finish depth turning insert comprising: opposite first and second surfaces which define a reference plane located therebetween and extending parallel therewith; a peripherally extending peripheral surface connected to the first and second surfaces; a first corner defining, at the first surface, a corner radius; a cutting edge formed between the first surface and the peripheral surface, and extending along the first corner as well as first and second edge portions connected to and extending from different sides of the first corner; and a chip control arrangement formed at the first surface; the reference plane defining: an upward direction directed perpendicularly from the reference plane towards the first surface; a downward direction opposite to the upward direction; and a bisector plane perpendicular to the reference plane and bisecting the first corner; the bisector plane defining an inward direction directed into the insert and parallel with the reference plane; the chip control arrangement being symmetric about the bisector plane, and comprising: a medium protuberance; and a finish protuberance located between the medium protuberance and the first corner; the medium protuberance comprising: first and second medium deflector surfaces respectively facing the first and second edge portions; and a medium upper surface connected to the first and second medium deflector surfaces and being located further from the reference plane than the cutting edge; the finish protuberance comprising: a front finish deflector surface; a rear surface extending to the medium protuberance; first and second relief surfaces extending from the front finish deflector surface to the rear surface, and respectively facing the first and second edge portions; and a finish peak connected to the front finish deflector surface, the rear surface and the first and second relief surfaces, and located closer to the reference plane than the cutting edge.

It will be understood that while each element in a chip control arrangement provides a desirable function, it was discovered subsequent to design and testing of several different designs that certain features in the aspects above may have contributed to obtainment of the best results for overall tool life at the finish depth range together with excellent burr performance.

In particularly, without being bound to theory, it is believed that the combination of provision of a finish protuberance (the extra material increasing structural strength and thereby reducing the chipping at the cutting edges adjacent thereto) together with relieved side surfaces thereof ("relief surfaces") (the reduced material providing sufficient space for functionality of the cutting edges adjacent thereto) was significant in the obtainment of the superior results of this design over the other designs tested.

It will be understood that the above-said is a summary, and that any of the aspects above may further comprise any of the features described hereinbelow. Specifically, the following features, either alone or in combination, may be applicable to any of the above aspects:

A. An insert can comprise opposite first and second surfaces. The first and second surfaces can be parallel with each other. The insert can comprise a peripherally extending peripheral surface connected to the first and second surfaces.

B. First and second surfaces of an insert can define a reference plane $P_R$ located therebetween and extending parallel therewith. The reference plane can define: an upward direction directed perpendicularly from the reference plane towards the first surface; a downward direction opposite to the upward direction; and a bisector plane perpendicular to the reference plane and bisecting the corner. The reference plane can be located midway between the first and second surfaces.

C. An insert can comprise a corner defining, at a first surface, a corner radius.

D. A cutting edge can be formed between a first surface and a peripheral surface.

E. A cutting edge can extend along a corner as well as first and second edge portions connected to and extending from different sides of the corner.

F. Each of the first and second edge portions can be formed with a concave recess. The concave recess can be configured to direct chips towards the finish and/or medium protuberances. Stated differently, the concave recess can be configured to direct chips away from a workpiece.

G. A bisector plane can define an inward direction directed into an insert and parallel with a reference plane. A chip control arrangement can be symmetric about the bisector plane.

H. An insert can comprise a chip control arrangement. The chip control arrangement can be formed at a first surface of the insert. There can be another chip control arrangement in accordance with the subject matter of the present application formed at each corner of the insert at the first surface or at every corner of the insert at both the first and second surfaces thereof.

I. A chip control arrangement can comprise a medium protuberance; and a finish protuberance located between the medium protuberance and a corner.

J. A medium protuberance can taper towards a finish protuberance. In a plan view of the medium upper surface, the medium protuberance can taper towards the finish protuberance. Additionally, in such view, the medium protuberance can comprise straight or concave edges. Such shape can be beneficial in providing more chip space between the medium protuberance and the cutting edge.

K. A medium protuberance can comprise first and second medium deflector surfaces respectively facing the first and second edge portions.

L. A medium protuberance can comprise a medium upper surface connected to the first and second medium deflector surfaces and being located further from the reference plane than the cutting edge. In embodiments where the insert is double-sided, the medium upper surface can constitute a part of a bearing surface. The bearing surface can extend over a majority of the first surface. The bearing surface can comprise bulging portions adjacent each negative edge.

M. A medium protuberance can comprise a front medium deflector surface. The front medium deflector surface can extend in upward and inward directions to the medium upper surface.

N. A medium protuberance can comprise a medium protuberance tip.

O. A finish protuberance can comprise a front finish deflector surface.

P. A finish protuberance can comprise first and second relief surfaces. The first and second relief surfaces can extend from a front finish deflector surface to a rear surface. The first and second relief surfaces can respectively face first and second edge portions. Each relief surface can be planar or convex shaped in a section taken perpendicular to an associated edge portion. In a section taken perpendicular to an associated edge portion, each relief surface can be connected between a concave shaped land and a finish peak.

Q. A finish protuberance can comprise a rear surface extending from a finish peak to a medium protuberance.

R. A finish protuberance can comprise a finish peak. The finish peak can be connected to a front finish deflector surface, a rear surface and first and second relief surfaces of the finish protuberance. Stated differently, the finish protuberance can have a pyramid shape. The finish peak can be located closer to the reference plane than the cutting edge.

S. Along a bisector plane, a chip control arrangement can defines a land connected to the cutting edge and extending therefrom to a trough. A trough for the purposes of the specification and claims means a lowest point. The land can extend along the length of the cutting edge with a similar geometry to that along the bisector plane. Along the bisector plane, the land can extend from a cutting edge in downward and inward directions to a trough. Without being bound to theory, it is believed that the immediate downward and inward slant of the land (i.e. without a neutral land first extending parallel with a reference plane and subsequently descending in the downward and inward directions) can be beneficial in improving burr performance. Along an entire cutting edge the land can extend from the cutting edge in downward and inward directions to the trough.

T. A front finish deflector surface can be connected to a trough within a distance of less than twice the corner radius from a corner intersection of the bisector plane and the cutting edge. Preferably, the front finish deflector surface can be connected to the trough within a distance of a single corner radius from the intersection. Best experimental results have been achieved when an entirety of a connection of the front finish deflector surface to the trough is within a distance of a single corner radius from the intersection.

p U. Along a bisector plane, a front finish deflector surface can extend from a trough to a finish peak in either the inward direction only or in both the inward and upward directions. Without being bound to theory, it is believed that the front finish deflector surface extending in the inward and upward directions can provide better performance than just in the inward direction.

V. A front finish deflector surface can be planar.

W. First and second relief surfaces can be located further from the cutting edge than the front finish deflector surface.

X. Distance between each of the first and second relief surfaces and the cutting edge adjacent thereto (e.g., a distance between the first relief surface and the first edge portion of the cutting edge) can increase with increasing distance between the front finish deflector surface and said each of the first and second relief surfaces.

Y. First and second relief surfaces can have an elongated shape.

Z. In a plan view of a first surface (e.g., FIG. 2 or 4A), the first and second relief surfaces can be both located between the bisector plane and a respective relief plane. Each relief plane can be perpendicular to a reference plane and passing through a corner intersection of the bisector plane and the cutting edge. Each relief plane can form a smaller relief angle with the bisector plane than an edge angle formed between the bisector plane and an edge plane extending perpendicular to an associated edge portion. In a plan view of the first surface, the first and second relief surfaces can be both located between the bisector plane and a respective relief plane. Each relief plane is perpendicular to the reference plane and passes through a corner intersection of the bisector plane and the cutting edge. Each relief plane can form a smaller relief angle with the bisector plane than an edge angle formed between the bisector plane and an edge plane extending perpendicular to an associated edge portion. Relief angles between 15° and 45° are believed to be feasible and relief angles between 20° and 30° are believed to provide best results.

AA. Along a bisector plane, a rake angle (i.e. measured between a land and a reference plane $P_R$) can be between 5° and 25°. The rake angle along the entire cutting edge can be between 5° and 25°. Preferably, the rake angle at the bisector plane and/or along the entire cutting edge can be between 12° and 20°. In view of experimental results it is believed that the most preferred range for the rake angle at the bisector plane and/or along the entire cutting edge to be between 12° and 20°. It will be understood that while the latter range may provide the best burr performance results, it would result in unacceptable performance if used in a rough depth machining operation. An increasing a positive rake angle can be beneficial for shallower depth machining but detrimental for deeper depths. For example, a rake angle of 5° may provide acceptable results for finish and medium depth operations, but poor results for rough depth operations, and a 12° rake angle has been found to provide even better results for finish up to medium depth operations but can be expected to result in unacceptable performance if used in a rough depth operation. The above-mentioned rake angle can be along the entire cutting edge.

BB. An insert can comprise an additional corner adjacent to another corner and formed with an additional cutting edge. The insert can further comprise a negative rake angle edge formed along a first surface and a peripheral surface and between cutting edges of the corners. Stated differently, there can be a negative rake angle edge connecting two edge portions of an insert. It will be understood that while such negative rake angle edge can be beneficial in reducing chip hammering, such feature can cause the insert to have unacceptable performance if used in a rough depth operation.

CC. An insert can comprise first and second medium guide surfaces connected to a medium protuberance and extending therefrom in the downward direction as well as respectively towards first and second edge portions (e.g., the first medium guide surface extending downwardly and towards the first edge portion). Each of the first and second medium guide surfaces can be part of a respective first and second guide protuberance. Each guide protuberance can comprise a tip (or "guide protuberance tip"). Each medium guide surface can be a surface of a wedge-shaped guide protuberance. Each guide protuberance can comprise a guide peak. Each medium guide surface can extend downwardly from an associated guide peak.

DD. To avoid redirecting chips back towards a workpiece from which they came, the first and second medium guide surfaces can each be spaced from an edge portion adjacent thereto. More precisely, each guide protuberance tip and the medium protuberance tip can be spaced apart from a same edge portion by equal distances.

EE. the guide protuberance tip and the medium protuberance tip are spaced apart from a same adjacent edge portion by equal distances.

FF. A distance D1 is defined from a corner intersection of a bisector plane and a cutting edge to one of first and second medium guide surfaces, and a distance D2 is defined from the same corner intersection to a closest point on the front medium deflector surface 42. The distance D1 is between three and five times the distance D2 ($3 \cdot D2 \leq D1 \leq 5 \cdot D2$).

GG. A distance D3 is defined from a corner intersection of a bisector plane and a cutting edge to one of first and second medium guide surfaces, measured parallel with an associated edge portion, and a parallel distance D4 is defined as the overall length of an insert edge between adjacent such corner intersections. Preferably, $\frac{1}{8} \cdot D4 \leq D3 \leq \frac{1}{3} \cdot D4$.

BRIEF DESCRIPTION OF THE DRAWINGS

For a better understanding of the subject matter of the present application, and to show how the same may be carried out in practice, reference will now be made to the accompanying drawings, in which.

DETAILED DESCRIPTION

Figure 1:
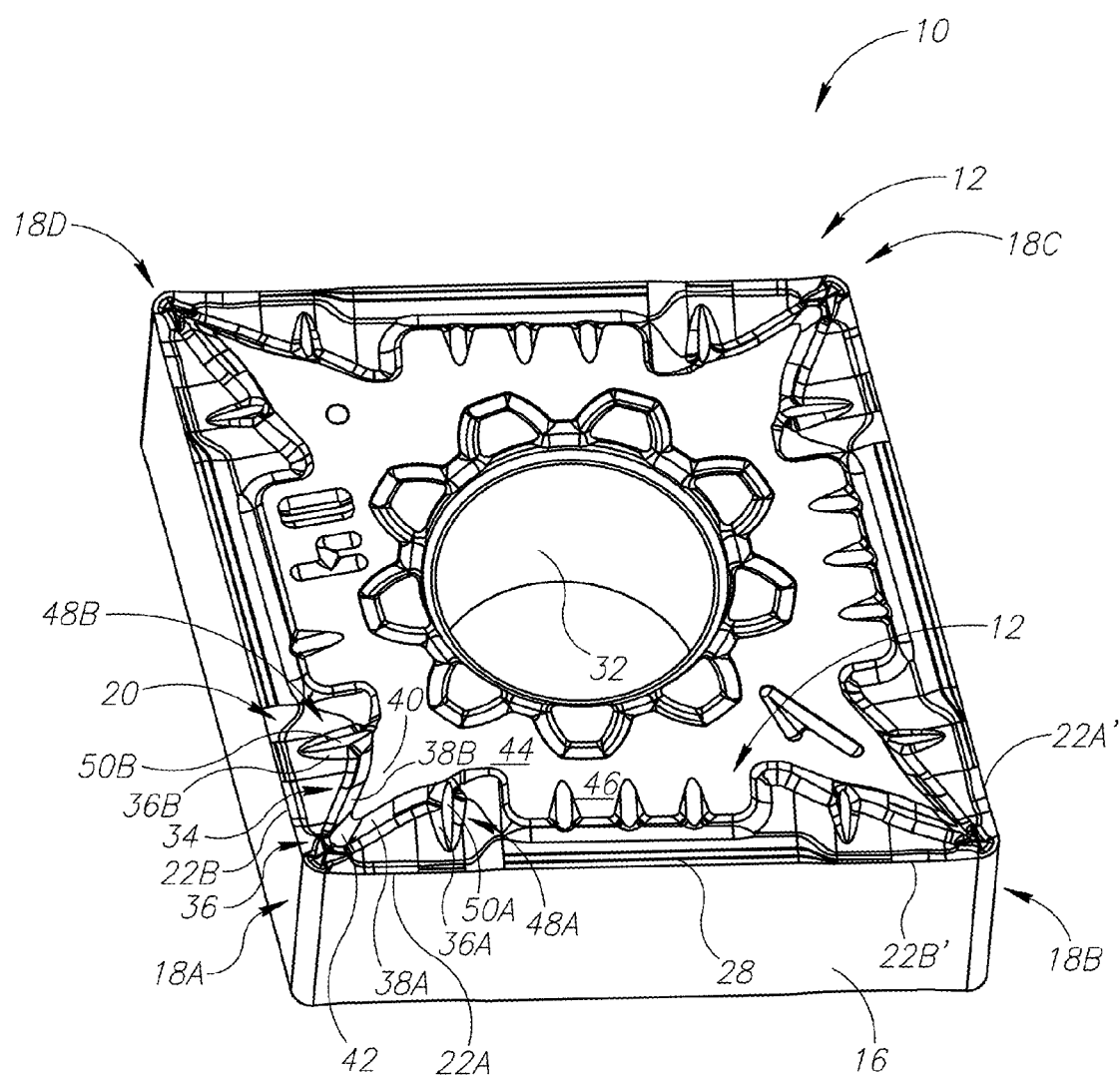
FIG. 1 is an upper perspective view of an insert in accordance with the subject matter of the present application.
Figure 2:
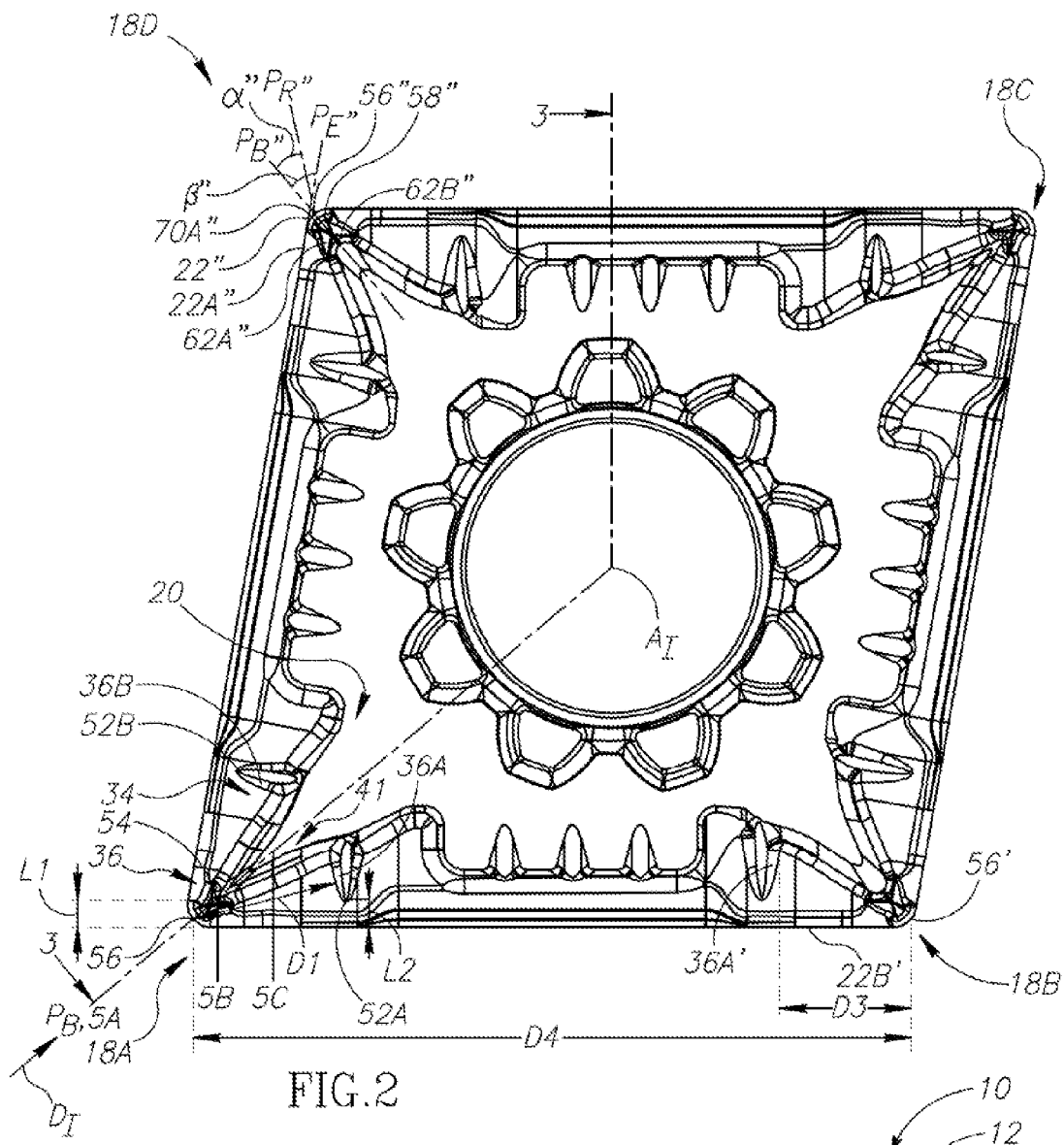
FIG. 2 is a plan view of a first surface of the insert in FIG. 1.
Figure 3:
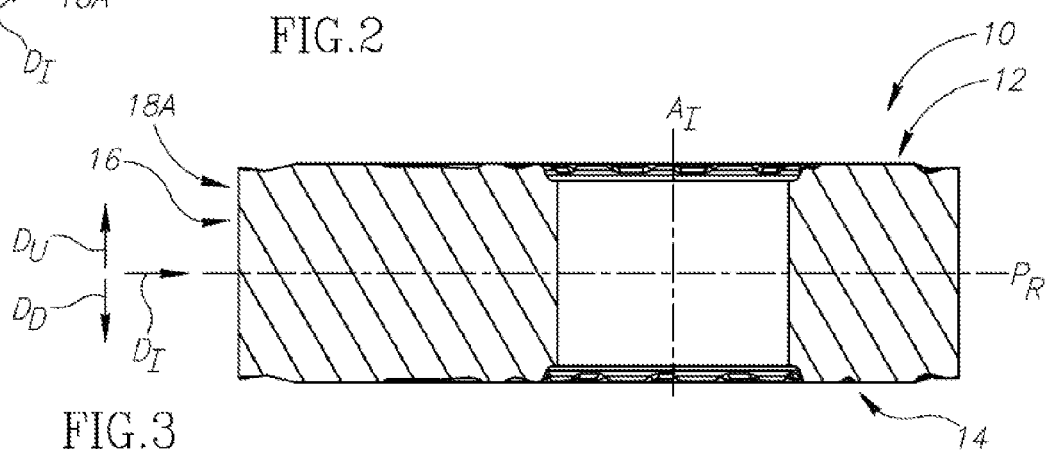
FIG. 3 is a cross section view taken along line 3-3 in FIG. 2.

Reference is made to FIGS. 1 to 3, illustrating a finish depth turning insert 10 for machining operations. The insert 10 is typically made of extremely hard and wear-resistant material such as cemented carbide, either by form-pressing and then sintering carbide powders in a binder or by powder injection molding methods.

As best shown in FIG. 3, the insert 10 can comprise opposite first and second surfaces 12, 14 and a peripherally extending peripheral surface 16 connected to the first and second surfaces 12, 14. The first and second surfaces 12, 14 can define a reference plane $P_R$ located midway therebetween and extending parallel therewith.

The reference plane $P_R$ can define an upward direction $D_U$ directed perpendicularly from the reference plane $P_R$ towards the first surface 12; and a downward direction $D_D$ opposite to the upward direction $D_U$. It will be understood that the reference plane $P_R$ is used merely to define the orientation of the upward and downward directions $D_U$, $D_D$ and does not represent a starting point thereof.

The insert 10 comprises at least one corner 18A, 18B, 18C, 18D.

The insert 10 comprises at least one chip control arrangement 20 associated with the corner 18A and the first surface 12. Unless stated otherwise, the following description will only be directed to one chip control arrangement (i.e. the arrangement designated with the numeral "20"), however, it will be understood that each corner of the insert 10, at either or both of the first and second surfaces 12, 14, can have a corresponding chip control arrangement. In any case, in the present example the insert 10 has a corresponding chip control arrangement on each corner thereof and at both the first and second surfaces of each corner, i.e. eight such arrangements. It will also be understood that the first surface 12 (and the second surface 14 in the example shown) is a rake surface, over which chips (not shown) cut from a cut workpiece (not shown) flow. It will be understood that the peripheral surface 16 constitutes a relief surface of the insert 10.

Figure 4A:
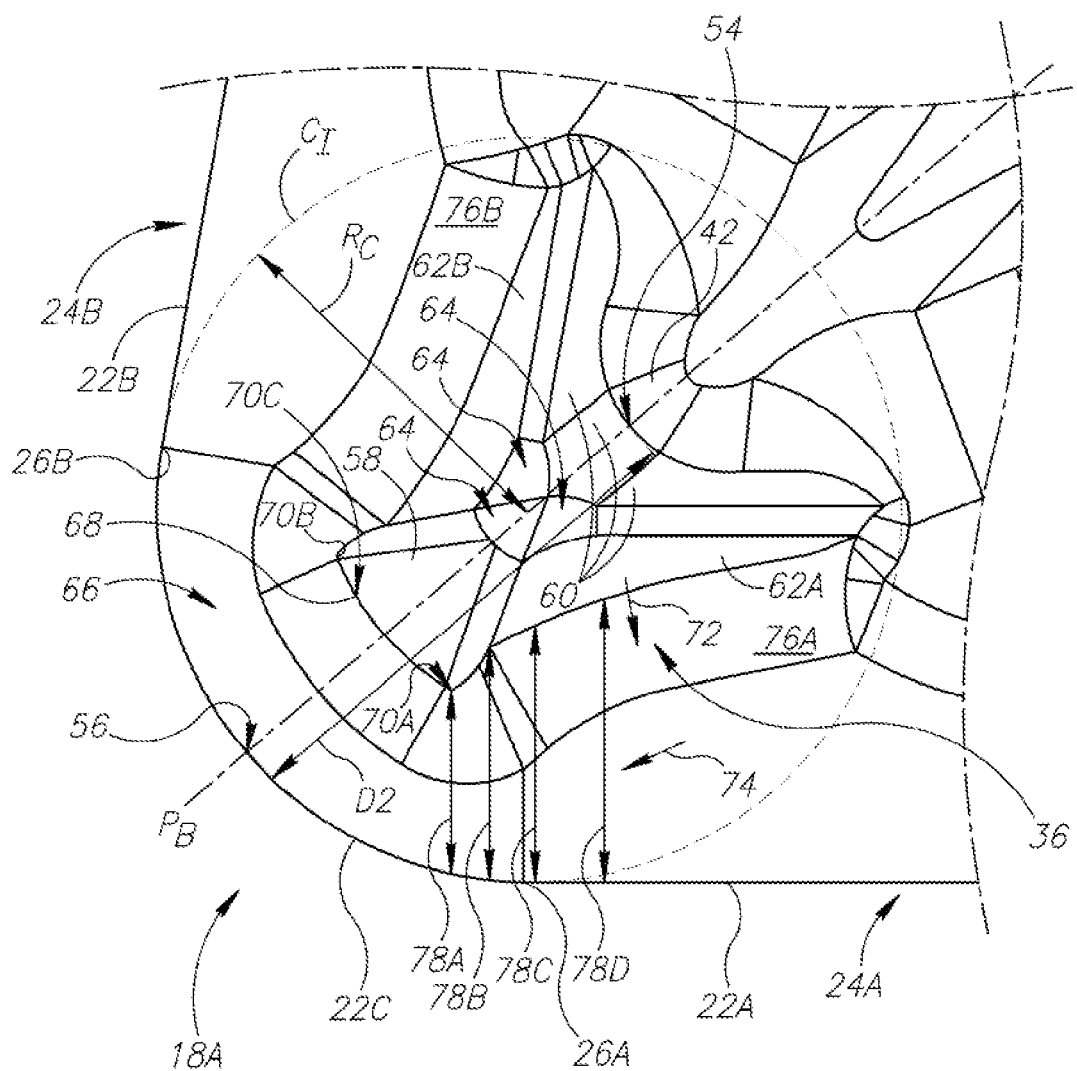
FIG. 4A is an enlarged view of a portion located at a lower left part of the insert in FIG. 2.

Referring to FIG. 4A, the corner 18A can define a corner radius $R_C$. More precisely, the corner radius $R_C$ is a radius of an inscribed circle $C_I$ of the corner 18A in a plan view of the first surface 12.

In FIG. 2, a bisector plane $P_B$ is shown which is perpendicular to the reference plane $P_R$ and which bisects the corner 18A (i.e. dividing the corner 18A into equal halves). The chip control arrangement 20 can preferably be symmetric about the bisector plane $P_B$.

The bisector plane $P_B$ defines an inward direction $D_I$ (FIGS. 2, 3) which is directed inwardly into the insert 10 and is parallel with the reference plane $P_R$.

Figure 4B:
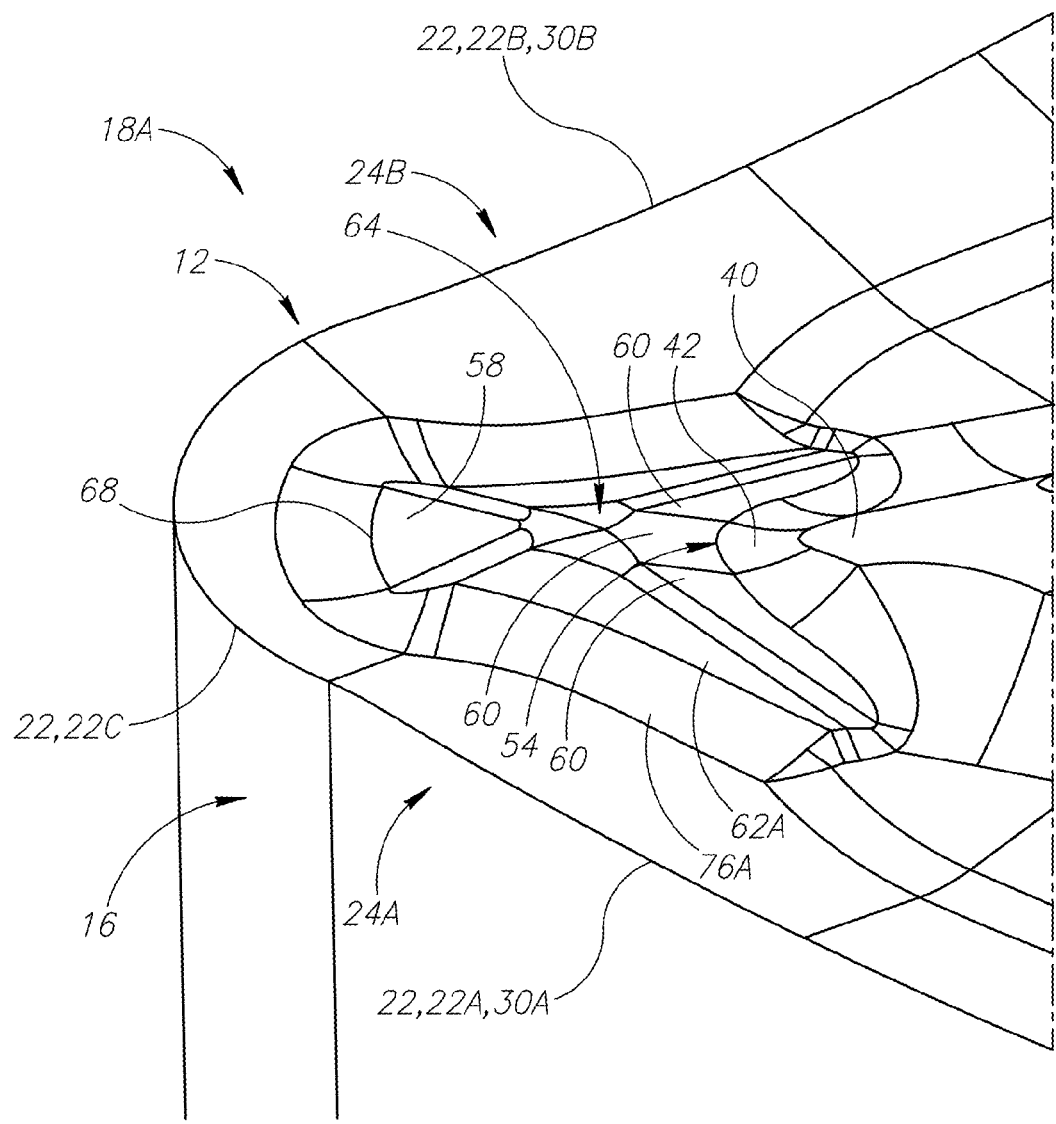
FIG. 4B is an upper perspective view of the portion in FIG. 4A.

Referring also to FIG. 4B, a cutting edge 22 is formed between the first surface 12 and the peripheral surface 16. More precisely, the cutting edge 22 can comprise first and second sub-cutting edges 22A, 22B respectively located along first and second edge portions 24A, 24B, and a third sub-cutting edge 22C extending along the corner 18A and connected to the first and second sub-cutting edges 22A, 22B. First and second connection points 26A, 26B (FIG. 4A) of the third sub-cutting edge 22C and first and second sub-cutting edges 22A, 22B are located where the curvature of the corner 18A transitions to the straight (in a plan view of the first surface) first and second edge portions 24A, 24B.

Corresponding features of different corners are identified with a common reference character and are suffixed with one or more apostrophes (e.g., a second sub-cutting edge of the corner 18B is designated as 22B').

Drawing attention to FIG. 1, between adjacent corners, e.g. the corners designated 18A and 18B, there can be a negative rake angle edge 28 formed at the first surface 12 and the peripheral surface 16 and between cutting edges 22A, 22B' of the corners 18A, 18B.

Each cutting edge 22 can end at a point spaced apart from the negative rake angle edge 28.

Along each of the first and second edge portions 24A, 24B, there can be formed a concave recess 30A, 30B in a side view or perspective side view thereof (FIG. 4B).

The insert 10 can be configured to be secured to a tool via a screw (not shown), for example by being formed with a through-hole 32. The through-hole 32 can be located in the center of the insert 10. The through-hole 32 can open out to the first and second surfaces 10, 12.

An insert axis $A_I$ can extend through the center of the insert 10. The insert axis $A_I$ can extend through the center of the through-hole 32. The insert axis $A_I$ can be perpendicular to the reference plane $P_R$.

Referring to FIG. 1, the chip control arrangement 20 can comprise a medium protuberance 34 and a finish protuberance 36 located between the medium protuberance 34 and the corner 18A. The chip control arrangement 20 can also comprise first and second medium guide surfaces 36A, 36B.

The medium protuberance 34 can be configured to control chips (not shown) during medium depth cutting operations. The first and second medium guide surfaces 36A, 36B can be configured to guide chips during medium depth cutting operations to the medium protuberance 34.

Similarly, the finish protuberance 36 can be configured to control chips (not shown) during finish depth cutting operations.

The medium protuberance 34 can comprise first and second medium deflector surfaces 38A, 38B, respectively facing the first and second edge portions 24A, 24B, a medium upper surface 40 connected to the first and second medium deflector surfaces 38A, 38B, and a front medium deflector surface 42.

As shown best in FIG. 2, the medium protuberance 34 can taper towards the finish protuberance 36.

Arrow 41 indicates a region where the medium protuberance 34 has a slight concavity.

In the present example, as the insert 10 is double-sided, the medium upper surface 40 can constitute a part of a bearing surface 44 for mounting of the insert 10 on a tool (not shown). More specifically, the insert 10 can be configured for mounting thereof only via the bearing surface 44. Accordingly the bearing surface 44 can be ground. The bearing surface 44 can extend over a majority of the first surface 12. To increase the mounting area of the bearing surface 44, it can further comprise bulging portions 46 adjacent each negative edge 28.

The first and second medium guide surfaces 36A, 36B can be connected to the medium protuberance 34 and can extend therefrom in the downward direction $D_D$ as well as respectively towards first and second edge portions 22A, 22B. The first medium guide surface 36A can face towards the second edge portion 24B, and the second medium guide surface 36B can face towards the first edge portion 24A.

Each medium guide surface 36A, 36B can be a surface of a wedge-shaped guide protuberance 48A, 48B. Each guide protuberance 48A, 48B can further comprise a guide peak 50A, 50B.

To avoid redirecting chips back towards a workpiece from which they came, the first and second medium guide surfaces 36A, 36B can each be spaced from the corresponding edge portion 24A, 24B adjacent thereto. Preferably, each tip (i.e. first or second guide tip 52A, 52B, FIG. 2) of the guide protuberances 48A, 48B can be spaced apart from the edge portion adjacent thereto the same distance as a medium tip 54 (FIG. 4A) of the medium protuberance 34, for allowing a chip to reach both tips e.g. 52A, 54, at about the same time. Stated differently, it can be seen, e.g., in FIG. 2, that a first spacing distance L1 (from the medium tip 54 to the first edge portion 24A) is the same magnitude as a second spacing distance L2 (from the first guide tip 52A to the first edge portion 24A).

The first and second medium guide surfaces 36A, 36B are a distance D1 (FIG. 2) from a corner intersection 56 of the bisector plane $P_B$ and the cutting edge 22. A closest point on to a closest point on the front medium deflector surface 42 can be a distance D2 (FIG. 4A) from the corner intersection 56. The magnitude of distance D1 is preferably between three and five times the distance D2 ($3 \cdot D2 \leq D1 \leq 5 \cdot D2$).

A distance D3 (referring to corner 18B in FIG. 2, for ease of visibility only) is defined from the associated corner intersection 56' to the associated first guide surface 36A' thereof, which is measured parallel with the associated edge portion 24B'. A parallel distance D4 is defined as the overall length of an insert edge between adjacent corner intersections 56, 56' (i.e. intersections of the bisectors and cutting edges. Preferably, $\frac{1}{8} \cdot D4 \leq D3 \leq \frac{1}{3} \cdot D4$. It will be understood that reducing the distance of a guide surface from a corner, in comparison to the overall length of the side of the insert, can allow more area to be designed as part of a bearing surface and can therefore contribute to stability of the insert.

Drawing attention to FIGS. 4A and 4B, the finish protuberance 36 can comprise a front finish deflector surface 58, a rear surface 60, first and second relief surfaces 62A, 62B extending from the front finish deflector surface 58 to the rear surface 60, and a finish peak 64.

The chip control arrangement 20 can further define a land 66 connected to the cutting edge 22 and extending therefrom to a trough 68.

The front finish deflector surface 58 can be connected to the trough 68. The connection of the front finish deflector surface 58 can be from first and second lower extremities 70A, 70B of the front finish deflector surface 58 and along a front finish deflector lower edge 70C extending between the first and second lower extremities 70A, 70B. As seen in FIG. 4A, along the bisector plane $P_B$, a distance between the corner intersection 56 and the front finish deflector surface 58 is less than twice the corner radius $R_C$.

The rear surface 60 can extend from the finish peak 64 to the medium protuberance 34. More precisely, the rear surface 60 can extend to the front medium deflector surface 42.

The first and second relief surfaces 62A, 62B can extend from the front finish deflector surface 58 to the rear surface 60, and can respectively face the first and second edge portions 24A, 24B. It will be understood that when stating the relief surfaces "face" the edge portions, this means that in a plan view, using the first relief surface 62A as an example, the first relief surface 62A faces towards the first edge portion 24A, i.e. generally in the direction of arrow 72. To elaborate, whether or not there is curvature of the relief surfaces, e.g. directing the arrow 72 in a three dimensional sense "above" the first edge portion 24A (i.e. out of the page in FIG. 4A), this is still considered as facing the first edge portion 24A (i.e. in the plan view). A surface facing the direction of arrow 74, i.e. towards the third sub-cutting edge 22C, for example formed on a convex or otherwise non-relieved shape (i.e. in the plan view) would not be considered as facing an edge portion. Such convex or non-relieved shapes can unduly reduce the area between the first edge portion 24A and the finish protuberance 36, thereby resulting in less effective machining.

However in a cross sectional, or side perspective view similar to that shown in FIG. 4B, each relief surface 62A, 62B can be planar or convex shaped.

Each relief surface 62A, 62B can be connected between a concave shaped land 76A, 76B and the finish peak 64.

The relief surfaces 62A, 62B can be located further than the front finish deflector surface 58 from the cutting edge 22. For example, the first lower extremity 70A is shown to be a distance 78A from the cutting edge 22, whereas each following distance from the first relief surface 62A to the cutting edge 22 (designated 78B, 78C and 78D) is shown to be progressively greater in magnitude and all are greater than the distance 78A.

In a plan view of a first surface (e.g., FIG. 2, referring to the chip control arrangement at corner 18D for ease of visibility only), the first and second relief surfaces 62A", 62B" can be both located between the bisector plane $P_{B''}$ and a respective relief plane $P_{R''}$. The relief plane $P_{R''}$ can be perpendicular to the reference plane $P_R$ and passes through a corner intersection 56" of the bisector plane $P_{B''}$ and the cutting edge 22". The relief plane $P_{R''}$ can also pass through the outermost point of the front finish deflector surface 58", (e.g., the first lower extremity 70A"). Each relief plane $P_{R''}$ can form a smaller relief angle $\alpha''$ with the bisector plane $P_{B''}$ than an edge angle $\beta''$ formed between the bisector plane $P_{B''}$ and an edge plane $P_{E''}$ extending perpendicular to the reference plane and containing an associated edge portion 24A".

Figure 5A:
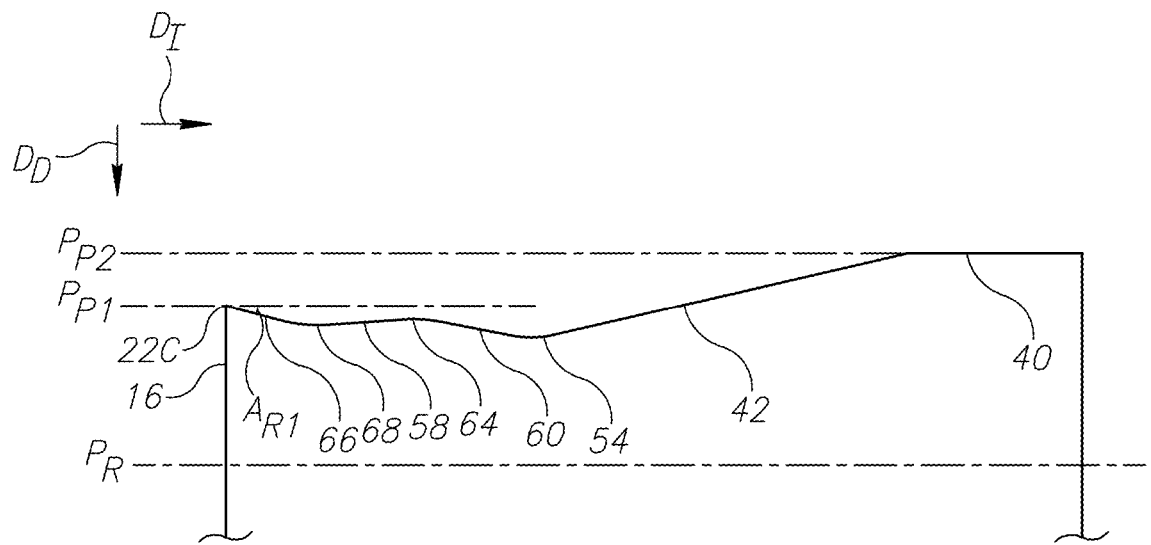
FIG. 5A is a schematic cross-section of the first surface taken along line 5A in FIG. 2.

Referring to FIG. 5A, which shows a section along the bisector plane $P_B$, there is also shown first and second parallel planes $P_{P1}$, $P_{P2}$, which are parallel with the reference plane $P_R$. More precisely, the first parallel plane $P_{P1}$ intersects the third sub-cutting edge 22C and the second parallel plane $P_{P2}$ intersects the medium upper surface 40.

Figure 5B:
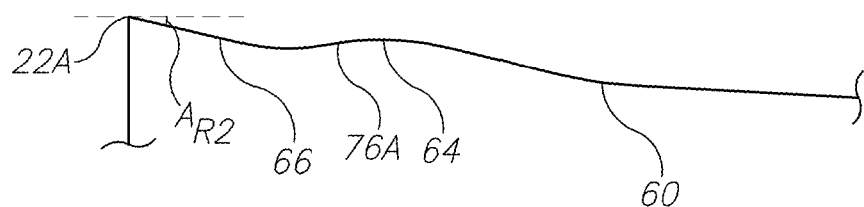
FIG. 5B is a schematic cross-section of the first surface taken along line 5B in FIG. 2.
Figure 5C:
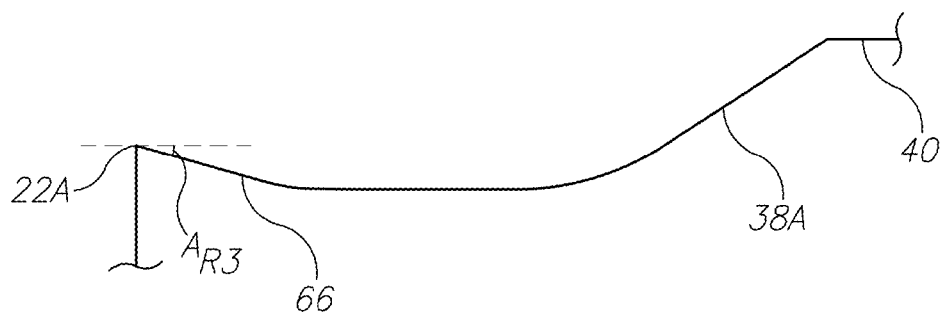
FIG. 5C is a schematic cross-section of the first surface taken along line 5C in FIG. 2.

Starting from the third sub-cutting edge 22C, the land 66 extends in the downward and inward directions $D_I$, $D_U$ to the trough 68. Stated differently, the third sub-cutting edge 22C has a positive rake angle. Better performance was found with the land extending in these directions than with a land which first extends parallel with the first parallel plane $P_{P1}$ and then subsequently slopes in the downward and inward directions $D_I$, $D_U$. The entire cutting edge 22 has a positive rake angle. Preferred values for the rake angle $A_{R1}$ at the bisector is 15°, at a 0.5 mm section ($A_{R2}$, FIG. 5B) is 13° and at a 1.5 mm section ($A_{R3}$, FIG. 5C) is 16°. These points are notable as they correspond to desired cutting depths for the insert 10. As stated above, distances spaced from the 1.5 mm section do not have to have a positive rake angle as they are not intended to be used for machining and can even be negative for different benefits.

The front finish deflector surface 58 can extend from the trough 68 to the finish peak 64 in both the inward and upward directions $D_I$, $D_U$ as shown. It is noted that even if the front finish deflector surface 58 would only extend in the inward direction $D_I$, there can still be a finish peak as the other areas adjacent the peak can be lower than the trough 68.

Figure 6:
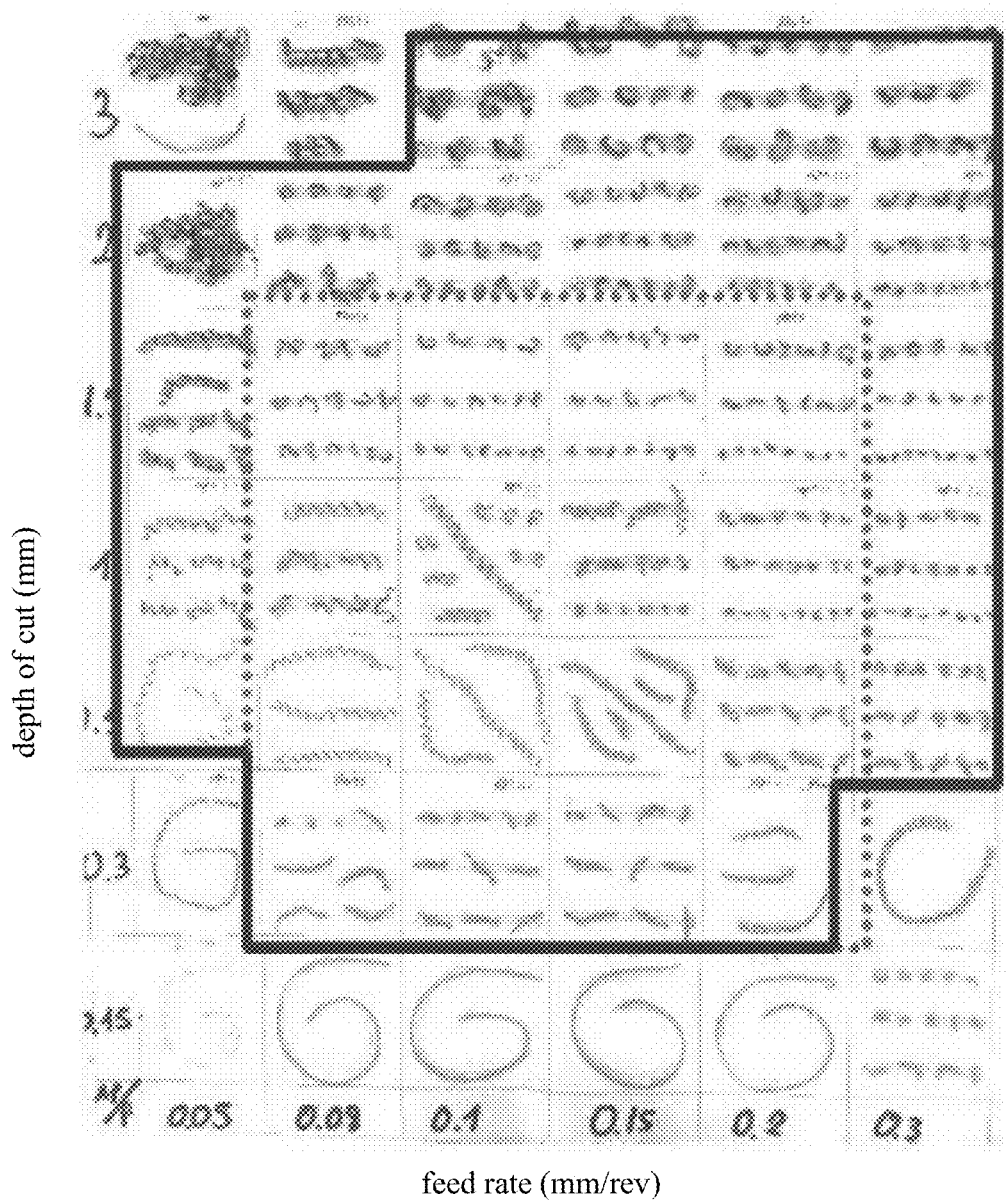
FIG. 6 is a photograph of experimental results.

Referring to FIG. 6, chips produced from experimental results of an insert in accordance with the subject matter of the present application are shown.

The horizontal axis shows feed rate (f) at 0.05, 0.08, 0.1, 0.15, 0.2 and 0.3 millimeters per revolution (mm/rev).

The vertical axis shows depth of cut (Ap) at 0.15, 0.3, 0.5, 1, 1.5, 2 and 3 millimeters.

While not shown, burr at low Ap (0.5 millimeters) was also documented after 8, 16, 24 and 32 minutes of machining.

As shown by the dotted line, the target performance area was for a feed rate of 0.08 to 0.2 mm/rev at a depth of 0.3 to 1.5 mm.

The experiment was carried out under the following conditions (work material: SUS316L, Vc=150 m/min, wet, designation CNMG 431, success criterion: length of chip L≤100 mm).

As shown in FIG. 6, suitably sized chips were produced even outside of the desired range (encompassed by the dotted line), as shown within the thick continuous line, i.e. slightly into the adjacent medium depth range.

Out of several designs developed and parallel testing of an insert of an industry leading competitor, the chip control arrangement 20 of the present application produced the best overall results of the criteria of tool life and burr at Ap=0.5 mm and 1.5 mm.

What is claimed is:

1. A finish depth turning insert comprising:
opposite first and second surfaces which define a reference plane located therebetween and extending parallel therewith;
a peripherally extending peripheral surface connected to the first and second surfaces;
a first corner defining, at the first surface, a corner radius;
a cutting edge formed between the first surface and the peripheral surface, and
extending along the first corner as well as first and second edge portions connected to and extending from different sides of the first corner; and
a chip control arrangement formed at the first surface;
the reference plane defining:
an upward direction directed perpendicularly from the reference plane towards the first surface;
a downward direction opposite to the upward direction; and
a bisector plane perpendicular to the reference plane and bisecting the first corner;
the bisector plane defining
an inward direction directed into the insert and parallel with the reference plane;
the chip control arrangement being symmetric about the bisector plane, and comprising:
a medium protuberance; and
a finish protuberance located between the medium protuberance and the first corner;
the medium protuberance comprising:
first and second medium deflector surfaces respectively facing the first and second edge portions; and
a medium upper surface connected to the first and second medium deflector surfaces and being located further from the reference plane than the cutting edge;
the finish protuberance comprising:
a front finish deflector surface;
a rear surface extending to the medium protuberance;
first and second relief surfaces extending from the front finish deflector surface to the rear surface, and respectively facing the first and second edge portions; and
a finish peak connected to the front finish deflector surface, the rear surface and the first and second relief surfaces, and located closer to the reference plane than the cutting edge, wherein
in a plan view of the insert, the bisector plane intersects the cutting edge at a corner intersection;
along the bisector plane, a distance between the corner intersection and the front finish deflector surface is less than twice the corner radius;
the rear surface extends in the inward direction and along the bisector plane, to the medium protuberance; and
the rear surface is no further from the reference plane than the finish peak.

2. The insert according to claim 1, wherein:
along the bisector plane, the chip control arrangement further defines a land connected to the cutting edge and extending therefrom to a trough; and
the front finish deflector surface is connected to the trough within a distance of less than twice the corner radius from the corner intersection of the bisector plane and the cutting edge.

3. The insert according to claim 2, wherein, along the bisector plane, the front finish deflector surface extends from the trough to the finish peak in either the inward direction only or in both the inward and upward directions.

4. The insert according to claim 2, wherein the front finish deflector surface is connected to the trough within a distance of a single corner radius from the corner intersection.

5. The insert according to claim 4, wherein the entire connection of the front finish deflector surface to the trough is within a distance of a single corner radius from the corner intersection.

6. The insert according to claim 2, wherein, along the bisector plane, the land extends from the cutting edge in the downward and inward directions to the trough.

7. The insert according to claim 6, wherein, along the bisector plane, a rake angle is between 5° and 25°.

8. The insert according to claim 7, wherein, the rake angle along the entire cutting edge is between 5° and 25°.

9. The insert according to claim 8, wherein, the rake angle along the entire cutting edge is between 12° and 20°.

10. The insert according to claim 1, wherein the first and second relief surfaces are located further from the cutting edge than the front finish deflector surface.

11. The insert according to claim 10, wherein the distance between each of the first and second relief surfaces and the cutting edge adjacent thereto increases with increasing distance between the front finish deflector surface and said each of the first and second relief surfaces.

12. The insert according to claim 1, wherein the first and second relief surfaces have an elongated shape.

13. The insert according to claim 1, wherein, in a plan view of the first surface, the first and second relief surfaces are both located between the bisector plane and a respective relief plane,
each relief plane being perpendicular to the reference plane and passing through both (a) a corner intersection of the bisector plane and the cutting edge, and (b) an outermost point of the front finish deflector surface,
each relief plane forming a smaller relief angle with the bisector plane than an edge angle formed between the bisector plane and an edge plane extending perpendicular to the reference plane and containing an associated edge portion.

14. The insert according to claim 1, wherein the front finish deflector surface is planar.

15. The insert according to claim 1, further comprising a second corner adjacent to said first corner and formed with a second cutting edge, the insert further comprising a negative rake angle edge formed along the first surface and the peripheral surface between said cutting edge and the additional second cutting edge.

16. The insert according to claim 1, further comprising first and second medium guide surfaces connected to the medium protuberance and extending therefrom in the downward direction as well as respectively towards the first and second edge portions.

17. The insert according to claim 16, wherein the first and second medium guide surfaces each are spaced from the edge portion adjacent thereto.

18. The insert according to claim 16, wherein:
the first and second medium guide surfaces are part of respective first and second guide protuberances, and
each guide protuberance comprises a guide protuberance tip,
the medium protuberance comprises a medium protuberance tip, and
the guide protuberance tip and the medium protuberance tip are spaced apart from a same adjacent edge portion by equal distances.

19. The insert according to claim 16, wherein:
a distance D1 is defined from a corner intersection of a bisector plane and a cutting edge to one of first and second medium guide surfaces,
a distance D2 is defined from the same corner intersection to a closest point on a front medium deflector surface 42 of the medium protuberance, and
the distance D1 is between three and five times the distance D2 ($3 \cdot D2 \leq D1 \leq 5 \cdot D2$).

20. The insert according to claim 16, wherein:
a distance D3 is defined from a corner intersection of the bisector plane and the cutting edge to one of the first and second medium guide surfaces, measured parallel with an associated edge portion, and
a parallel distance D4 is defined as the overall length of the insert edge between the corner intersection and an adjacent such corner intersection; and
$\frac{1}{8} \cdot D4 \leq D3 \leq \frac{1}{3} \cdot D4$.

21. The insert according to claim 1, wherein, in a plan view of the medium upper surface, the medium protuberance tapers towards the finish protuberance.

22. The insert according to claim 21, wherein, in a plan view of the medium upper surface, the medium protuberance comprises either straight edges or concave edges.

23. The insert according to claim 1, wherein each of the first and second edge portions is formed with a concave recess.

24. The insert according to claim 1, wherein, the finish protuberance has a pyramid shape.

25. A finish depth turning insert comprising:
opposite first and second surfaces which define a reference plane located therebetween and extending parallel therewith;
a peripherally extending peripheral surface connected to the first and second surfaces;
a first corner defining, at the first surface, a corner radius;
a cutting edge formed between the first surface and the peripheral surface, and
extending along the first corner as well as first and second edge portions connected to and extending from different sides of the first corner; and
a chip control arrangement formed at the first surface;
the reference plane defining:
an upward direction directed perpendicularly from the reference plane towards the first surface;

a downward direction opposite to the upward direction; and a bisector plane perpendicular to the reference plane and bisecting the first corner;

the bisector plane defining an inward direction directed into the insert and parallel with the reference plane;

the chip control arrangement being symmetric about the bisector plane, and comprising:

a medium protuberance; and a finish protuberance located between the medium protuberance and the first corner;

the medium protuberance comprising:

first and second medium deflector surfaces respectively facing the first and second edge portions; and a medium upper surface connected to the first and second medium deflector surfaces and being located further from the reference plane than the cutting edge;

the finish protuberance comprising:

a front finish deflector surface;

a rear surface extending to the medium protuberance;

first and second relief surfaces extending from the front finish deflector surface to the rear surface, and respectively facing the first and second edge portions; and a finish peak connected to the front finish deflector surface, the rear surface and the first and second relief surfaces, and located closer to the reference plane than the cutting edge, wherein the rear surface extends in the inward direction and along the bisector plane, to the medium protuberance;

the rear surface is no further from the reference plane than the finish peak;

the finish peak, the front finish deflector surface and the rear surface are all closer to the reference plane than the cutting edge; and the finish peak is further from the reference plane than both the front finish deflector surface and the rear surface.

26. A finish depth turning insert comprising:

opposite first and second surfaces which define a reference plane located therebetween and extending parallel therewith;

a peripherally extending peripheral surface connected to the first and second surfaces;

a first corner defining, at the first surface, a corner radius;

a cutting edge formed between the first surface and the peripheral surface, and extending along the first corner as well as first and second edge portions connected to and extending from different sides of the first corner; and a chip control arrangement formed at the first surface;

the reference plane defining:

an upward direction directed perpendicularly from the reference plane towards the first surface;

a downward direction opposite to the upward direction; and a bisector plane perpendicular to the reference plane and bisecting the first corner;

the bisector plane defining an inward direction directed into the insert and parallel with the reference plane;

the chip control arrangement being symmetric about the bisector plane, and comprising:

a medium protuberance; and a finish protuberance located between the medium protuberance and the first corner;

the medium protuberance comprising:

first and second medium deflector surfaces respectively facing the first and second edge portions; and a medium upper surface connected to the first and second medium deflector surfaces and being located further from the reference plane than the cutting edge;

the finish protuberance comprising:

a front finish deflector surface;

a rear surface extending to the medium protuberance;

first and second relief surfaces extending from the front finish deflector surface to the rear surface, and respectively facing the first and second edge portions; and a finish peak connected to the front finish deflector surface, the rear surface and the first and second relief surfaces, and located closer to the reference plane than the cutting edge;

wherein:

the insert further comprises first and second medium guide surfaces connected to the medium protuberance and extending therefrom in the downward direction as well as respectively towards the first and second edge portions; and the first and second medium guide surfaces are part of respective first and second guide protuberances, and each guide protuberance comprises a guide protuberance tip, the medium protuberance comprises a medium protuberance tip, and the guide protuberance tip and the medium protuberance tip are spaced apart from a same adjacent edge portion by equal distances.

* * * * *